(12) United States Patent
Berkei et al.

(10) Patent No.: US 8,410,206 B2
(45) Date of Patent: Apr. 2, 2013

(54) STABILIZATION OF ORGANIC POLYMERS AGAINST FREE RADICALS

(75) Inventors: Michael Berkei, Haltern am See (DE); Ulrich Nolte, Kleve (DE); Thomas Sawitowski, Essen (DE)

(73) Assignee: Byk-Chemie GmbH, Wesel (DE)

( * ) Notice: Subject to any disclaimer, the term of this patent is extended or adjusted under 35 U.S.C. 154(b) by 639 days.

(21) Appl. No.: 11/715,860

(22) Filed: Mar. 8, 2007

(65) Prior Publication Data

US 2009/0099288 A1    Apr. 16, 2009

(30) Foreign Application Priority Data

Mar. 9, 2006  (DE) .......................... 10 2006 011 375
Oct. 13, 2006  (EP) ..................................... 06021515

(51) Int. Cl.
*C08K 3/10* (2006.01)
*C08K 3/22* (2006.01)
*C08K 3/18* (2006.01)

(52) U.S. Cl. .......................... 524/403; 524/413; 524/430

(58) Field of Classification Search .................. 524/403, 524/413, 430

See application file for complete search history.

(56) References Cited

U.S. PATENT DOCUMENTS

| | | | | |
|---|---|---|---|---|
| 5,553,630 A | * | 9/1996 | Dupuis et al. ................. | 132/202 |
| 5,718,907 A | * | 2/1998 | Labarre .......................... | 424/401 |
| 2004/0157972 A1 | * | 8/2004 | Yamaguchi et al. .......... | 524/430 |
| 2006/0046120 A1 | | 3/2006 | Merzougui et al. | |

FOREIGN PATENT DOCUMENTS

| | | | |
|---|---|---|---|
| JP | 04041547 A | | 2/1992 |
| JP | 04359047 A | | 12/1992 |
| JP | 07003070 A | | 1/1995 |
| JP | 07258520 A | | 10/1995 |
| JP | 08283451 A | | 10/1996 |
| JP | 2000191919 A | | 7/2000 |
| WO | WO 2005072680 A2 | * | 8/2005 |
| WO | WO 2005072695 A1 | * | 8/2005 |

OTHER PUBLICATIONS

R. B. Cundall et all., "The Photocatalytie oxidation of liquid phase propan-2-ol by pure rutile and titanium dioxide pigments", J. Oil Col. Chem: Assoc., vol. 61, pp. 351-355 (1978).
A. Valet, "Light Stabilizers for Paints", excerpt, pp. 22-41, Curt R. Vinzentz Verlag, Hannover, Germany (1997).
Römpp Chemielexikon, (Römpp's Encyclopedia of Chemistry), 10th Edition, Georg Thieme Verlag, Suttgart/New York, (1998), pp. 3695-3697, vol. 5 keywords "Radikalfanger" and "Radikale".
Römpp Chemielexikon, (Römpp's Encyclopedia of Chemistry), 10th Edition, Georg Thieme Verlag, Suttgart/New York, , (1999), p. 2403, vol. 6 keyword "Lichtschutzmittell" (light stabilizers).
Römpp Chemielexikon, (Römpp's Encyclopedia of Chemistry), 10th Edition, Georg Thieme Verlag, Suttgart/New York, (1997), pp. 4787-4788, vol. 3 keyword "UV-Absorber".

* cited by examiner

*Primary Examiner* — William Cheung
(74) *Attorney, Agent, or Firm* — Brannon Robinson PC

(57) ABSTRACT

The invention concerns the use of cerium dioxide, especially in the form of discrete cerium dioxide particles with particle sizes in the range from 0.005 to 150 μm, as inorganic radical trap to stabilize organic polymers, especially in the form of polymer-based formulations, varnishes, paints, coating compounds, or the like, against their photochemically, thermally, physically and/or chemically induced degradation by free radicals, especially against the effect of UV, advantageously in an optional combination with at least one UV-absorber and/or at least one additional radical trap. The radical-induced degradation of the organic polymers is effectively prevented by the use of cerium dioxide without the cerium dioxide itself becoming degraded. If a combination of cerium dioxide with an additional UV-absorber or radical trap is used, its effectiveness is extended through the presence of the cerium dioxide.

21 Claims, No Drawings

STABILIZATION OF ORGANIC POLYMERS AGAINST FREE RADICALS

CROSS REFERENCES TO RELATED APPLICATIONS

This application claims priority to German Patent Application No. DE 10 2006 011 375.6, filed Mar. 9, 2006, entitled "STABILIZATION OF ORGANIC POLYMERS AGAINST FREE RADICALS", and European Patent Application EP 06021515.9, filed Oct. 13, 2006, entitled "STABILIZATION OF ORGANIC POLYMERS AGAINST FREE RADICALS", which references are expressly incorporated by reference herein, in their entirety.

BACKGROUND OF THE INVENTION

The presentation concerns the stabilization of organic polymers against free radicals or UV effects.

In particular the presentation concerns the use of cerium dioxide $CeO_2$, especially in the form of discrete cerium dioxide particles, as an inorganic radical trap to stabilize organic polymers against degradation by free radicals, which can be generated especially by photochemical, thermal, physical and/or chemical induction or by exposure to UV (effect of ultraviolet radiation or ultraviolet light).

Moreover, the presentation concerns polymer compositions, especially in the form of polymer-based varnishes, paints, coating compounds or the like that contain cerium dioxide, especially in the form of discrete cerium dioxide particles, as inorganic radical trap.

In addition, the presentation concerns an agent for stabilizing organic polymers against photochemically, thermally, physically and/or chemically induced degradation by free radicals, especially against UV effects, and a method for stabilizing organic polymers, especially in the form of polymer-based formulations like varnishes, paints, coating compounds or the like, against such degradation by free radicals.

To stabilize organic polymers, for example in the form of polymer-based varnishes, paints, coating compounds or the like, against, for example photochemically induced, degradation by free radicals there are currently essentially four groups of substances or classes of substances in use:

For one there are organic UV-absorbers, for example those based on hydroxyphenylbenzotriazoles, hydroxybenzophenones, hydroxyphenyltriazines, oxyanilines, hydroxyphenylpyrimidines, salicylic acid derivates and cyanoacrylates.

Another group is organic radical traps, especially ones based on sterically hindered amines or on phenols.

In addition, peroxide-decomposing substances like thioethers, phosphites, etc., are used.

Finally, special inorganic fillers or pigments are used, for example ones based on zinc oxide, titanium dioxide, carbon blacks, iron oxides or the like, where especially filler particles with particle sizes in the range from 0.005 to 100 µm are used.

Said substances or classes of substances affect the process of degradation of inorganic polymers in view of the effect of ultraviolet radiation in different ways:

For instance, it is known that both the organic UV-absorbers of said kind and said inorganic fillers or pigments are capable of absorbing incident ultraviolet radiation via electron excitation and, in the ideal case, converting it to thermal energy.

However, limits are imposed on said reaction: the absorption of the UV radiation is not complete, so that unabsorbed UV radiation leads to radical-forming reactions within the polymer. However, the absorbed UV radiation also leads, via electron excitation processes, to radical-forming reactions within the polymer. Thus, all in all both unabsorbed and absorbed UV radiation leads to radical chain reactions in polymers, and bonds can be split, which can lead to degradation of the polymer matrix and, for example in the case of organically based lacquers, paints, coating compounds or the like, can also lead to degradation of the underlying substrate and moreover can cause color change processes, especially yellowing, of the polymers and/or the substrate.

In order to prevent said processes or at least to contain them to a large degree, organic radical traps of said kind are frequently combined with UV-absorbers today. The effects that arise from the radicals are largely neutralized by said substances, but the UV-absorbers and the organic radical traps gradually break down over time and thus lose effectiveness. Connected with that, a time-dependent effect in UV stabilization will always be observed where organic radical traps are combined with organic or even inorganic UV-absorbers.

For further details on the UV stabilization of paints, lacquers, coatings or the like, one can refer, for example, to A. Valet, *Light Stabilizers for Paints*, Curt R. Vincentz Publishers, Hannover, 1997 (ISBN 3-87870-443-7 Gb.).

BRIEF SUMMARY

The invention concerns the use of cerium dioxide, especially in the form of discrete cerium dioxide particles with particle sizes in the range from 0.005 to 150 µm, as inorganic radical trap to stabilize organic polymers, especially in the form of polymer-based formulations, varnishes, paints, coating compounds, or the like, against their photochemically, thermally, physically and/or chemically induced degradation by free radicals, especially against the effect of UV, advantageously in an optional combination with at least one UV-absorber and/or at least one additional radical trap. The radical-induced degradation of the organic polymers is effectively prevented by the use of cerium dioxide without the cerium dioxide itself becoming degraded. If a combination of cerium dioxide with an additional UV-absorber or radical trap is used, its effectiveness is extended through the presence of the cerium dioxide.

One object of the present disclosure is to describe an improvement in the stabilization of organic polymers against free radicals or UV effects.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

The task of the present disclosure is to improve the stabilization of organic polymers against free radicals, especially to improve the stabilization of organic polymers against their photochemically, thermally, physically and/or chemically induced degradation by free radicals, for example against the effect of UV, while avoiding or at least reducing said disadvantages of the prior art.

Surprisingly, the applicant found that cerium dioxide, especially in particulate form, is excellently suitable as an inorganic radical trap with regard to the stabilization of organic polymers.

The objective of the presentation—in accordance with a first aspect of the presentation—is thus the use of cerium dioxide, especially in the form of discreet cerium dioxide particles, as inorganic radical trap for stabilization of organic polymers against, especially, photochemically, thermally, physically and/or chemically induced degradation by free radicals, especially against the effect of UV light.

Within the scope of the presentation the applicant has specifically found that cerium dioxide unexpectedly acts as an inorganic radical trap and in this way is capable of protecting organic polymers against, especially, photochemically, thermally, physically and/or chemically induced degradation by free radicals, or against the effect of UV, without the cerium dioxide itself being consumed or decomposed—in contrast to traditional, especially organic, radical traps.

The term "radical trap," as used within the scope of the presentation is a technical designation particularly for substances that make reactive free radicals harmless, for example by physical and/or chemical effects or reactions. For further details on the term "radical trap" and free radicals one can refer, for example, to Rompp's Chemical Lexicon [in German], Georg Thieme Publishers, Stuttgart/New York, 10$^{th}$ Edition, Vol. 5, 1998, pp. 3695-3697, keywords: "radical trap" and "radical," the entire relevant content of which, including the literature sources cited there, is hereby included by reference.

Up to now cerium dioxide was never considered as an inorganic radical trap. This particular effect and its technical use are based first of all on the discoveries of the applicant. At most the technique of using cerium dioxide as a coating of special titanium dioxide-containing pigments, where in these cerium dioxide-coated titanium dioxide pigment particles of the prior art (which are used, for example, in the production of metal effect and pearlescent pigments) the cerium dioxide acts, however, as a mediator in the recombination of electron-whole pairs which are generated from the photoactive titanium dioxide in the underlying layers, is known from the prior art; however, this application of the prior art necessarily requires—in contrast to the use of cerium dioxide as inorganic radical trap in accordance with the invention—the presence of titanium dioxide in direct combined action, and consequently does not have anything to do with the use of cerium dioxide as inorganic radical trap in accordance with the invention.

As previously described, the cerium dioxide is used especially in the form of discrete cerium dioxide particles. In general, the cerium dioxide particles that are used have particle sizes in the range from 0.005 to 150 μm, especially 0.01 to 100 μm. Said particle size values are to be understood to mean that at least 90%, especially at least 95%, preferably at least 99%, of the cerium dioxide particles that are used have particle sizes in said range. Nevertheless, it may possibly be necessary due to application or a special case to deviate from said values without going beyond the scope of the presentation.

The cerium dioxide particles that are used generally have average particle sizes $d_{50}$ in the range from 0.001 to 80 μm, especially 0.02 to 40 μm.

Said particle sizes can be determined by substantially known methods, for example by laser diffraction or the like.

According to a particular embodiment, the cerium dioxide can be used in combination with at least one UV-absorber and/or with at least one other additional radical trap. In an especially preferred embodiment the cerium dioxide can be used in combination with an organic or inorganic UV-absorber, especially an inorganic UV-absorber. In combination with the UV-absorber or absorbers and/or the additional radical trap or traps there arises a completely new combination of a UV stabilizer system that, in the case of inorganic UV-absorbers, is completely based on inorganic materials. However, the combination of cerium dioxide with organic UV-absorbers or organic radical traps extends the useful life of the UV-absorbers or organic radical traps significantly as a result of the property of the cerium dioxide that it acts as an inorganic radical trap and is able to convert radicals without its own decomposition.

The term "UV-absorber" is to be understood very broadly within the scope of the presentation and is used in accordance with the invention especially as a collective name for compounds with pronounced capacity for absorption of UV radiation that can be used as photoprotective agents or UV stabilizers, especially to improve the photostability of polymers, especially in industrial products. For further detail reference can be made to Rompp's Chemical Lexicon, ibid., Vol. 6, 1999, pp. 4787-4788, keyword: "UV-absorber," and Vol. 3, 1997, p. 2043, keyword: "photoprotective agents," the entire content of which, including the literature sources cited there, is hereby included by reference.

If the cerium dioxide in accordance with this particular embodiment is used in combination with a UV-absorber and/or another radical trap, the weight ratio of cerium dioxide on the one hand, to UV-absorber and/or radical trap on the other, with respect to the combination of cerium dioxide and UV-absorber and/or radical trap, should vary in the range from 0.05:99.5 to 50:50, especially 1:99 to 20:80. Nevertheless, it may be advantageous or necessary due to application or particular case to deviate from said ratios.

For example, inorganic UV-absorbers, preferably from the group of zinc oxides, titanium dioxides (for example rutile or anatase), iron oxides, carbon blacks, carbon as well as their mixtures are suitable as UV-absorbers for combining with the, especially, particulate cerium dioxide. In this case a combined UV stabilizer system is obtained that is exclusively based on inorganic materials.

Organic UV-absorbers are also equally suitable for combining with the cerium dioxide. Examples of organic UV-absorbers that are suitable in accordance with the invention for combining with the cerium dioxide are organic UV-absorbers from the substance classes of the hydroxyphenylbenzotriazoles, hydroxybenzophenones, hydroxyphenyltriazines, oxyanilines, hydroxyphenylpyrimidines, salicylic acid derivatives, cyanoacrylates, and their mixtures.

It is equally possible within the scope of the presentation to combine the cerium dioxide with another additional radical trap, especially an organic radical trap. Examples are organic radical traps from the group of the sterically hindered amines, phenols, and their mixtures.

The use of cerium dioxide in accordance with the invention can be applied to nearly any polymer.

Example of polymers that can be stabilized within the scope of the use in accordance with the invention are, for example, polyacrylates, polyesters, polyethers, polyamides, polyolefins, polybutadienes, and their mixtures, and copolymers and terpolymers of said polymers of said polymers. In particular, the polymers to be stabilized are a component of a complex system, especially a varnish, paint, coating compound, or the like.

The amounts in which cerium dioxide is used within the scope of the use in accordance with the invention can vary widely. In general the cerium dioxide is used in amounts from 0.1 to 20 wt %, especially 0.2 to 5 wt %, with respect to the polymers that are to be stabilized. Nevertheless, it can be necessary or advantageous due to special case or application to deviate from said amounts.

If the cerium dioxide is used in combination with a UV-absorber and/or another radical trap, the amounts of said substance or substances can vary in wide limits. In particular, the UV-absorber and/or the additional radical trap used in combination with the cerium dioxide can be used in amounts from 0.1 to 30 wt %, especially 0.3 to 10 wt %, with respect to the polymers that are to be stabilized. Nevertheless, it can be necessary or advantageous due to application or particular case to deviate from said amounts.

In the case of the combination of cerium dioxide on the one hand, and UV-absorber and/or additional radical trap on the other, the amount of the combination of cerium dioxide on the one hand, and UV-absorber and/or radical trap on the other, can equally vary widely. In particular, said combination is used in amounts from 0.2 to 50 wt %, especially 0.5 to 15 wt %, with respect to the polymers that are to be stabilized, but where it can be necessary or advantageous due to application or particular case to deviate from said amounts. As previously described, the cerium dioxide can be used as an inorganic radical trap especially in polymer-based lacquers, paints, coating compounds, or the like.

As the applicant surprisingly found, especially particulate cerium dioxide has the capacity to act as a trap for free radicals and thus to support the described radical process that can lead to degradation of polymers without itself becoming chemically or physically degraded. In an optimum combination with organic and/or inorganic UV-absorbers and/or additional radical traps, its effect can be significantly increased or improved through the combination use of cerium dioxide, since both the chemical degradation of the UV-absorbers and/or radical traps as such, as well as the photochemical degradation of the polymers to be stabilized, becomes clearly reduced. This is achieved through the use of, in particular, particulate cerium dioxide as inorganic radical trap. In combination with inorganic UV-absorbers there arises a completely inorganically based UV stabilizer system for polymers. However, the combination of cerium dioxide with organic UV-absorbers significantly extends their useful life as a consequence of the radical-trapping properties of the cerium dioxide.

Another objective of the presentation—in accordance with a second aspect of the presentation—consists of polymer compositions, especially in the form of polymer-based varnishes, paints, coating compounds, or the like, that contain cerium dioxide, especially in the form of discrete cerium dioxide particles, as inorganic radical traps, optionally together with at least one UV-absorber and/or with at least one additional radical trap. To avoid unnecessary repetition, one can refer to the embodiments referenced below for further details on the polymer compositions in accordance with the invention, concerning the use in accordance with the invention, which are correspondingly valid in reference to the polymer compositions in accordance with the invention.

In turn, another objective of the presentation—in accordance with a third aspect of the presentation—is an agent (i.e., a composition) for stabilizing organic polymers against, especially, photochemically, thermally, physically and/or chemically induced degradation by free radicals, especially against the effect of UV, where the agent consists of a combination of cerium dioxide, especially in the form of discrete cerium dioxide particles, as inorganic radical trap with at least one UV-absorber and/or at least one additional radical trap, especially with an inorganic or organic, preferably inorganic, UV-absorber. The objective of the presentation in accordance with this aspect of the invention is thus a stabilizer system for organic polymers based on the combination of cerium dioxide as inorganic radical trap on the one hand and a UV-absorber and/or another radical trap on the other. To avoid unnecessary repetition, one can refer, for further details on the agent in accordance with the invention, to the following embodiments on the use in accordance with the invention and the polymer compositions in accordance with the invention, which are correspondingly valid with respect to the agent in accordance with the invention.

Equally, an objective of the presentation is an agent (i.e., a composition) for stabilizing organic polymers against their especially photochemically, thermally, physically and chemically induced degradation by free radicals, especially against the effect of UV, where the agent consists of a combination of at least one inorganic radical trap based on a metal or semimetal oxide (for example $CeO_2$), especially in the form of discrete particles, with at least one inorganic UV-absorber (for example ZnO or $TiO_2$), preferably equally in particle form and/or preferably as separate particles. Equally encompassed by the invention is the corresponding use of this agent for said purpose. For further details concerning this embodiment of the invention and in order to avoid unnecessary repetition reference can be made to the following embodiments regarding the use in accordance with the invention and the polymer compositions in accordance with the invention, which are correspondingly valid here.

Finally, an objective of the invention—according to a fourth and last aspect of the presentation—is a method for stabilizing organic polymers, especially in the form of polymer-based formulations such as especially varnishes, paints, coating compounds or the like, against their especially photochemically, thermally, physically and/or chemically induced degradation by free radicals, especially against the effect of UV, where cerium dioxide, especially in the form of discrete cerium dioxide particles, is added to the polymers as inorganic radical trap, optionally in combination with at least one UV-absorber and/or with at least one additional radical trap. For further details on the method in accordance with the invention and to avoid unnecessary repetition reference is made to the following descriptions concerning the use in accordance with the invention, the polymer compositions in accordance with the invention and the stabilization agents in accordance with the invention, which are correspondingly valid in reference to the method in accordance with the invention.

The inorganic, metallic or semimetallic particles, especially cerium dioxide particles, are preferably homogeneously distributed or dispersed in the proposed agents for stabilizing organic polymers or in the polymer composition. Preferably the average distance between particles is a maximum of 500 µm, especially a maximum of 300 µm, really preferably 100 µm or less.

Said particles, especially cerium dioxide particles, are preferably formed separately from the minimum of at least one UV-absorber that is preferably additionally specified.

The cerium dioxide particles preferably consist exclusively of cerium dioxide. However, they can also contain other substances, impurities, or the like, thus they can be formed as mixed particles.

In accordance with another aspect of the presentation an inorganic agent is exclusively used for stabilization of organic polymers, so that the agent itself is not degraded by free radicals or the effect of UV.

Especially preferably, an exclusively inorganic UV-absorber or more than one inorganic UV-absorber is/are combined with an exclusively inorganic radical trap or more than one exclusively inorganic radical trap.

The preferred inorganic, metallic or semimetallic UV-absorber is especially in the form of separate (thus separate from the cerium dioxide particles or other particles) particles (for example of titanium dioxide and/or zinc dioxide and is preferably likewise homogeneously distributed or dispersed.

Other embodiments, modifications and variations of the presentation are easily recognized and realizable by the specialist upon reading the description, without the specialist having to go beyond the scope of the presentation.

The presentation is explained by means of the following embodiment examples, which, however, are not intended to limit the presentation in any way.

EMBODIMENT EXAMPLES

Example 1

Application Examples for the Use of Cerium Dioxide in Particle Form in Accordance with the Invention The following application examples for the use of cerium dioxide in particulate form in accordance with the invention were carried out:

Three glazes [clear lacquers] A, B and C were each applied to wood substrates in different thicknesses (glaze A: 30 μm; glaze B: 100 μm; glaze C: 100 μm). Glaze A was a polymer dispersion based on acrylate, methacrylate and polystyrene, while glazes B and C were acrylate dispersions.

The glazes were applied both as such ("blind sample"), and after incorporating different amounts of cerium oxide, by itself and in combination with an inorganic UV-absorber (zinc oxide or titanium dioxide), or after incorporation of zinc oxide alone ("comparison").

After exposure to artificial UV light for 500 h or 2000 h the differences in the gloss values (ΔG) and color values (ΔE) of the lacquer surface were then determined.

The results are given in the following Tables 1 to 4, where the particle size data refer to the average particle sizes:

TABLE 1

500 hours irradiation

| Glaze | 20 nm Cerium dioxide | 20 nm ZnO | 60 nm ZnO | ΔG | ΔE |
|---|---|---|---|---|---|
| A | | | | 12 | −32 |
| A | 0.5% | | | 10 | −20 |
| A | | 4.0% | | 6 | −18 |
| A | | | 4.0% | 9 | −22 |
| A | 0.5% | 2.0% | | 4 | −13 |
| A | 0.5% | | 2.0% | 7 | −12 |

TABLE 2

500 hours irradiation

| Glaze | 20 nm Cerium dioxide | ΔG | ΔE |
|---|---|---|---|
| B | | 14 | −31 |
| B | 0.5% | 6 | −20 |

TABLE 3

2000 hours irradiation

| Glaze | 20 nm Cerium dioxide | 20 nm ZnO | ΔG | ΔE |
|---|---|---|---|---|
| C | | | 10 | −32 |
| C | 0.2% | | 10 | −28 |
| C | 0.2% | 2.0% | 6 | −14 |

TABLE 4

2000 hours irradiation

| Glaze | 20 nm Cerium dioxide | 10 nm Titanium dioxide | ΔG | ΔE |
|---|---|---|---|---|
| C | | | 10 | −32 |
| C | 0.2% | | 10 | −28 |
| C | 0.2% | 1.0% | 7 | −16 |

As these results show, incorporation of cerium dioxide even in relatively small amounts causes a significant improvement of the UV stability of the polymer glazes compared to a blind sample without incorporation of UV-protective substances (see Tables 1 to 4).

These results equally show that through the combined incorporation of cerium dioxide as radical trap in combination with an inorganic UV-absorber (here: zinc oxide or titanium dioxide) the UV protective effect can be increased further (see Tables 1, 3 and 4).

As Table 1 shows, with cerium dioxide alone it is possible to achieve nearly the same or even better UV protection than with a traditional UV-absorber based on zinc oxide, and this is using only a fraction of the amount of cerium dioxide compared with that used by the traditional UV-absorber (specifically here: only an eighth of the amount of cerium dioxide by comparison with zinc oxide). The combination of cerium dioxide with zinc oxide while simultaneously halving the amount of zinc oxide again leads to a significant increase of the UV protective action (see Table 1), which goes beyond the purely additive effect of the individual components, and which points to a synergistic effect.

Example 2

Detection of the Radical-Trap Properties of Cerium Dioxide Particles

The following experiments were carried out to detect the properties of particulate cerium dioxide as radical trap:

a) A printing ink with light-sensitive organic inkjet pigments was mixed, in one case only with ZnO and in another case with a combination of ZnO and $CeO_2$, and then exposed to UVA light for 250 h. For comparison a blank sample without incorporation of ZnO and $CeO_2$ was irradiated in the same way.

The following a values and b values are obtained, where the values were determined with a BYK Gardner color measurement device and given in the CieLAB System (measurement method: ISO 7724):

| For red (a value): | |
| --- | --- |
| Initial value: | 36 |
| Blank value without protection: | 20  ($\Delta a = 16$) |
| Sample with 2% ZnO: | 32  ($\Delta a = 4$) |
| Sample with 1% CeO$_2$: | 31  ($\Delta a = 5$) |
| Sample with 2% ZnO and 1% CeO$_2$: | 37  ($\Delta a = -1$) |
| For blue (b value): | |
| Initial value: | −33 |
| Blank value without protection: | −13  ($\Delta b = 20$) |
| Sample with 2% ZnO: | −28  ($\Delta b = 5$) |
| Sample with 1% CeO$_2$: | −28  ($\Delta b = 5$) |
| Sample with 2% ZnO and 1% CeO$_2$: | −31  ($\Delta b = 2$) | b) Moreover, the oxidation of isopropanol to acetone in the presence of photoactive titanium dioxide in the stabilizing cerium dioxide was investigated by analogy with the method described in J. Oil Col. Chem. Assoc. 1978, 61, pp. 351-358 (R. B. Cundall et al., *The Photocatalytic Oxidation of Liquid Phase Propan-2-ol by Pure Rutile and Titanium Dioxide Pigments*):

A dispersion of 5% unstabilized nanoscale anatase in isopropanol iterates $1.5 \times 10^{-2}$ mol acetone/kg for irradiation of 60 minutes.

By adding 0.5% cerium dioxide this value decreases to $0.6 \times 10^{-2}$ mol acetone/kg and when 2% cerium dioxide is added it decreases to $0.1 \times 10^{-2}$ mol.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A method for stabilizing light-sensitive organic polymers against degradation by free radicals that are generated by photochemical, thermal, physical and/or chemical induction or by exposure of the polymers to UV light, where the polymers that are to be stabilized are components of a lacquer, a varnish, or a coating compound, and where the method includes the step of adding at least one inorganic radical trap to the polymers in combination with at least one UV-absorber or at least one additional radical trap, where the weight ratio of cerium dioxide to the at least one UV-absorber or the at least adding at least one inorganic radical trap to the polymers in combination with at least one UV-absorber or at least one additional radical trap, where the at least one inorganic radical trap includes cerium dioxide (CeO$_2$) in the form of discrete particles that consist exclusively of cerium dioxide and that have particle sizes in the range from 0.005 to 150 µm;

the weight ratio of cerium dioxide to the at least one UV-absorber or the at least one additional radical trap, with respect to the combination of cerium dioxide and the at least one UV-absorber or the at least one additional radical trap, is in the range from 1:99 to 20:80; and where the combination of cerium dioxide and the at least one UV-absorber or the at least one additional radical trap is used in an amount of from 0.5 to 15 wt % with respect to the polymers that are to be stabilized, said amount being effective to stabilize the light-sensitive organic polymers against degradation by said free radicals.

2. A method as in claim 1, where the cerium dioxide is used in combination with at least one inorganic UV-absorber.

3. A method as in claim 1, where the polymers that are to be stabilized are chosen from the group consisting of polyacrylates, polyesters, polyethers, polyamides, polyolefins, polybutadienes, and their mixtures, and co- and terpolymers of said polymers.

4. A polymer composition in the form of a lacquer, a varnish or a coating compound, where the composition contains light-sensitive polymers and at least one inorganic radical trap for stabilizing the polymers against degradation by free radicals that are generated by photochemical, thermal, physical and/or chemical induction or by exposure of the polymers to UV light, where the at least one inorganic radical trap includes cerium dioxide in the form of discrete cerium dioxide particles that consist exclusively of cerium dioxide and that have particle sizes in the range from 0.005 to 150 µm, and where the composition further contains at least one UV-absorber or at least one additional radical trap;

where the weight ratio of cerium dioxide to the at least one UV-absorber or the at least one additional radical trap, with respect to the combination of cerium dioxide and the at least one UV-absorber or the at least one additional radical trap, is in the range from 1:99 to 20:80; and where the combination of cerium dioxide and the at least one UV-absorber or the at least one additional radical trap is used in an amount of from 0.5 to 15 wt % with respect to the polymers that are to be stabilized, said amount being effective to stabilize the light-sensitive organic polymers against degradation by said free radicals.

5. An agent for stabilizing light-sensitive organic polymers against their degradation and use by free radicals that are generated by photochemical, thermal, physical and/or chemical induction or by exposure of the polymers to UV light, where the polymers are a component of a lacquer, a varnish or a coating compound, and where the agent includes a combination of at least one inorganic radical trap with at least one inorganic UV-absorber, where the at least one inorganic radical trap based on cerium dioxide in the form of discrete particles that consist exclusively of cerium dioxide and that have particle sizes in the range from 0.005 to 150 µm, where the weight ratio of cerium dioxide to the at least one inorganic UV-absorber, with respect to the combination of cerium dioxide and the at least one inorganic UV-absorber, is in the range from 1:99 to 20:80; and where the combination of cerium dioxide and the at least one inorganic UV-absorber is used in an amount of from 0.5 to 15 wt % with respect to the polymers that are to be stabilized, said amount being effective to stabilize the light-sensitive organic polymers against degradation by said free radicals.

6. An agent as in claim 5, where the at least one inorganic UV-absorber is chosen from the group of titanium dioxide, zinc oxide, and their mixtures.

7. An agent as in claim 6, where the at least one inorganic UV-absorber is zinc oxide providing a synergistic effect when said agent is used to stabilize light-sensitive organic polymers against their degradation and use by free radicals that are generated by photochemical, thermal, physical and/or chemical induction or by exposure of the polymers to UV light.

8. The method of claim 1, where the polymers that are to be stabilized are components of a lacquer.

9. The method of claim 1, where the polymers that are to be stabilized are components of a varnish.

10. The method of claim 1, where the polymers that are to be stabilized are components of a paint.

11. The method of claim 1, where the polymers that are to be stabilized are components of an ink.

12. The polymer composition of claim 4 in the form of a lacquer.

13. The polymer composition of claim 4 in the form of a varnish.

14. The polymer composition of claim 4 in the form of a paint.

15. The polymer composition of claim 4 in the form of an ink.

16. The polymer composition of claim 4 where the polymers that are to be stabilized are chosen from the group consisting of polyacrylates, polyesters, polyethers, polyamides, polyolefins, polybutadienes, and their mixtures, and co- and terpolymers of said polymers.

17. The method as in claim 1, where the cerium dioxide particles have average particle sizes $d_{50}$ in the range from 0.01 to 80 μm.

18. The polymer composition of claim 4, wherein at least 90% of the cerium dioxide particles sizes are in said 0.005 to 150 μm range.

19. A method for stabilizing light-sensitive organic polymers against degradation by free radicals that are generated by photochemical, thermal, physical and/or chemical induction or by exposure of the polymers to UV light, where the polymers that are to be stabilized are components of a lacquer, a varnish, or a coating compound, where the polymers that are to be stabilized are chosen from the group consisting of polyacrylates, polyesters, polyethers, polyamides, polyolefins, polybutadienes, and their mixtures, and co- and terpolymers of said polymers, and where the method includes the step of adding at least one inorganic radical trap to the polymers in combination with at least one UV-absorber or at least one additional radical trap, where the at least one inorganic radical trap includes cerium dioxide ($CeO_2$) in the form of discrete particles that consist exclusively of cerium dioxide and that have particle sizes in the range from 0.005 to 150 μm;

where the weight ratio of cerium dioxide to the at least one UV-absorber or the at least one additional radical trap, with respect to the combination of cerium dioxide and the at least one UV-absorber or the at least one additional radical trap, is in the range from 1:99 to 20:80; and where the combination of cerium dioxide and the at least one UV-absorber or the at least one additional radical trap is used in an amount of from 0.5 to 15 wt % with respect to the polymers that are to be stabilized, said amount being effective to stabilize the light-sensitive organic polymers against degradation by said free radicals.

20. A polymer composition in the form of a lacquer, a varnish or a coating compound, where the composition contains light-sensitive polymers and at least one inorganic radical trap for stabilizing the polymers against degradation by free radicals that are generated by photochemical, thermal, physical and/or chemical induction or by exposure of the polymers to UV light, where the polymers that are to be stabilized are chosen from the group consisting of polyacrylates, polyesters, polyethers, polyamides, polyolefins, polybutadienes, and their mixtures, and co- and terpolymers of said polymers, where the at least one inorganic radical trap includes cerium dioxide in the form of discrete cerium dioxide particles that consist exclusively of cerium dioxide and that have particle sizes in the range from 0.005 to 150 μm, and where the composition further contains at least one UV-absorber or at least one additional radical trap;

where the weight ratio of cerium dioxide to the at least one UV-absorber or the at least one additional radical trap, with respect to the combination of cerium dioxide and the at least one UV-absorber or the at least one additional radical trap, is in the range from 1:99 to 20:80; and where the combination of cerium dioxide and the at least one UV-absorber or the at least one additional radical trap is used in an amount of from 0.5 to 15 wt % with respect to the polymers that are to be stabilized, said amount being effective to stabilize the light-sensitive organic polymers against degradation by said free radicals.

21. An agent for stabilizing light-sensitive organic polymers against their degradation and use for free radicals that are generated by photochemical, thermal, physical and/or chemical induction or by exposure of the polymers to UV light, where the polymers are a component of a lacquer, a varnish or a coating compound, where the polymers that are to be stabilized are chosen from the group consisting of polyacrylates, polyesters, polyethers, polyamides, polyolefins, polybutadienes, and their mixtures, and co- and terpolymers of said polymers, and where the agent includes a combination of at least one inorganic radical trap with at least one inorganic UV-absorber, where the at least one inorganic radical trap based on cerium dioxide in the form of discrete particles that consist exclusively of cerium dioxide and that have particle sizes in the range from 0.005 to 150 μm, where the weight ration of cerium dioxide to the at least one inorganic UV-absorber, with respect to the combination of cerium dioxide and the at least one inorganic UV-absorber, is in the range from 1:99 to 20:80; and where the combination of cerium dioxide and the at least one inorganic UV-absorber is used in an amount of from 0.5 to 15 wt % with respect to the polymers that are to be stabilized, said amount being effective to stabilize the light-sensitive organic polymers against degradation by said free radicals.

* * * * *